(12) United States Patent
Singer et al.

(10) Patent No.: US 10,699,821 B2
(45) Date of Patent: Jun. 30, 2020

(54) COLLIMATOR ASSEMBLY FOR AN X-RAY SPECTROMETER DEVICE

(71) Applicant: Hitachi High-Tech Analytical Science Finland Oy, Espoo (FI)

(72) Inventors: Reinhard Singer, Bad Steben (DE); Markus Pallasvirta, Ratingen (DE)

(73) Assignee: Hitachi High-Tech Analytical Science Finland Oy, Espoo (FI)

( * ) Notice: Subject to any disclaimer, the term of this patent is extended or adjusted under 35 U.S.C. 154(b) by 0 days.

(21) Appl. No.: 16/281,186

(22) Filed: Feb. 21, 2019

(65) Prior Publication Data
US 2019/0272928 A1 Sep. 5, 2019

(30) Foreign Application Priority Data
Mar. 1, 2018 (EP) .................................. 18159406

(51) Int. Cl.
*G21K 1/04* (2006.01)
*G21K 1/02* (2006.01)
*G01N 23/20008* (2018.01)
*G01N 23/20091* (2018.01)
(Continued)

(52) U.S. Cl.
CPC ............. *G21K 1/025* (2013.01); *G01K 1/02* (2013.01); *G01N 23/20008* (2013.01); *G01N 23/20091* (2013.01); *G21K 1/04* (2013.01); *G01N 2223/316* (2013.01); *H01F 7/0252* (2013.01)

(58) Field of Classification Search
CPC .... G21K 1/025; G21K 1/04; G01N 23/20091; G01N 23/2008; G01N 2223/316; H01F 7/0252; G01K 1/02
See application file for complete search history.

(56) References Cited

U.S. PATENT DOCUMENTS

| 3,614,424 A | * | 10/1971 | Openshaw ............... G21K 1/02 250/310 |
| 4,534,051 A | | 8/1985 | Grady et al. |

(Continued)

FOREIGN PATENT DOCUMENTS

| JP | H07-39595 | 2/1995 |
| JP | H08-285798 | 11/1996 |

OTHER PUBLICATIONS

Anonymous, "Stepper motor", from the Internet, wikipedia.org, Jun. 24, 2012, 10 pgs.

*Primary Examiner* — Kiho Kim
(74) *Attorney, Agent, or Firm* — Harrington & Smith

(57) ABSTRACT

In accordance with an aspect of the invention, a collimator assembly for a X-ray spectrometer device is provided, the collimator assembly including a rotatable gear assembly including a collimator plate having a plurality of apertures of different size and/or shape arranged therein; a driving assembly for rotating the gear assembly to bring the gear assembly into a rotational position where a selected one of the plurality of apertures is spatially aligned with a predefined axis along which a collimated X-ray beam is to be provided from the X-ray spectrometer device; and a magnet arrangement for generating a magnetic force that is arranged to push or pull the gear assembly into a predefined direction of rotation to keep the selected one of the plurality of apertures spatially aligned with said predefined axis.

15 Claims, 5 Drawing Sheets

(51) Int. Cl.
 *G01K 1/02* (2006.01)
 *H01F 7/02* (2006.01)

(56) References Cited

U.S. PATENT DOCUMENTS

| | | | |
|---|---|---|---|
| 6,653,637 B2 * | 11/2003 | Ochiai | G01N 23/225 |
| | | | 250/281 |
| 2007/0216504 A1 | 9/2007 | Gonzalez et al. | |
| 2011/0268247 A1 * | 11/2011 | Shedlock | G01V 5/0016 |
| | | | 378/62 |
| 2016/0192892 A1 | 7/2016 | Guez et al. | |

\* cited by examiner

COLLIMATOR ASSEMBLY FOR AN X-RAY SPECTROMETER DEVICE

TECHNICAL FIELD

The present invention relates to collimation of a primary X-ray beam in X-ray based spectrometry and, in particular, to a collimator assembly useable for X-ray based spectrometry such as energy dispersive X-ray spectrometry (EDX).

BACKGROUND

Analyzer devices that make use of X-ray spectrometry are typically employed, for example, for analysis of the elemental composition of a bulk sample or for determination of a thickness and elemental composition of a coating on a bulk substrate. X-ray spectrometry is based on the physical principle of X-ray fluorescence (XRF). A non-limiting example in this regard is energy dispersive X-ray spectrometry (EDX), which is employed in the following as a non-limiting example of techniques that rely on XRF.

FIG. 1 schematically illustrates some components of an EDX device. When powered, an X-ray tube 1 emits primary X-radiation that is used to excite X-ray fluorescence in a sample 3 under study. The primary X-rays emitted from the X-ray tube 1 are considered as a primary X-ray beam 5 and it may be provided in the soft and/or ultra-soft X-radiation regime. During an analysis, a shutter 2 is opened in order to let a primary X-radiation pass towards the sample 3. Alternatively, the X-ray tube 1 is only powered during analysis of the sample 3 and de-powered otherwise. In some setups, a primary filter 4 is brought into the primary beam 5. The physical realization of a primary filter may be, for example, a metallic plate with a thickness in the range of a few micrometers to several hundred micrometers. The primary filter 4 may be applied to modify the spectral distribution of the primary X-radiation in order to improve spectral sensitivity of the analysis. In a typical EDX device the primary filter 4 is implemented either as single fixed filter assembly or as an adjustable electro-mechanical filter assembly that allows for switching between primary filters of different characteristics.

In order to have a well-defined analysed area of the sample surface, the primary X-ray beam 5 is typically (but not exclusively) collimated by passing it through a collimator 6, which is predominantly realized by an aperture of desired shape and size arranged in a metallic plate. Typical aperture shapes include, for example, circular or rectangular apertures. The implementation of the collimator 6 can be either a fixed single metallic aperture of predefined shape and size or an electro-mechanical assembly that allows for to switch between apertures of different size and/or shape. Finally, the collimated and filtered primary X-ray beam 5 irradiates the sample 3 and thereby interacts with the sample material. Irradiation of the sample 3 invokes secondary X-radiation 7 to be emitted from the sample 3, including secondary X-ray fluorescence.

An energy dispersive detector 8 is used to collect the secondary X-radiation 7 emitted from the sample 3 in the direction of the detector window of the energy dispersive detector 8. The detector 8 generates an electrical signal that is descriptive of the secondary X-radiation 7, which electrical signal is provided to a multi-channel analyser 9 for analysis therein. An analysis across multiple channels enables deriving a spectrum of the secondary X-radiation 7 emitted from the sample 3 in a solid angle spanned by the detector window. An EDX device may further include a video microscopy arrangement integrated therein for observing and aligning the analysed portion of a surface of the sample 3.

In various applications of XRF devices, such as intensity mapping of the sample surface, coating thickness analysis, samples with fine structures, etc.) it is often desirable to have a high lateral spatial resolution. With the typical setup described in the foregoing with references to FIG. 1, a sufficiently high lateral spatial resolution can only be realized by implementing the collimator 6 such that it has an aperture that is sufficiently small in size. In this regard, typical aperture sizes (e.g. a diameter of a circular aperture or a diagonal of a rectangular aperture) are in the range of a few ten micrometers to a few hundred micrometers. Consequently, XRF devices that employ an electro-mechanical collimator assembly that enables switching between apertures of different shapes and/or sizes require accurate positioning of a selected aperture with respect to the primary X-ray beam 5 such that the collimated primary X-ray beam is accurately guided to a desired measurement location on the surface of the sample 3. Typically, required positioning precision is in the order of a fraction of the size (e.g. diameter or diagonal) of the selected aperture.

SUMMARY

It is therefore an object of the present invention to provide a collimator assembly for an X-ray spectrometer device such that the collimator assembly enables positioning of collimator apertures available in the X-ray spectrometer device at improved spatial precision.

In the following a simplified summary of some embodiments of the present invention is provided in order to facilitate a basic understanding of the invention. The summary is not, however, an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with an aspect of the invention, a collimator assembly for a X-ray spectrometer device is provided, the collimator assembly comprising a rotatable gear assembly including a collimator plate having a plurality of apertures of different size and/or shape arranged therein; a driving assembly for rotating the gear assembly to bring the gear assembly into a rotational position where a selected one of the plurality of apertures is spatially aligned with a pre-defined axis along which a collimated X-ray beam is to be provided from the X-ray spectrometer device; and a magnet arrangement for generating a magnetic force that is arranged to push or pull the gear assembly into a predefined direction of rotation to keep the selected one of the plurality of apertures spatially aligned with said predefined axis.

In accordance with another aspect of the invention, an energy dispersive X-ray spectrometer device is provided, the device comprising a collimator assembly according to an aspect of the invention described in the foregoing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF DRAWINGS

In the accompanying drawings.

DETAILED DESCRIPTION

Figure 2:
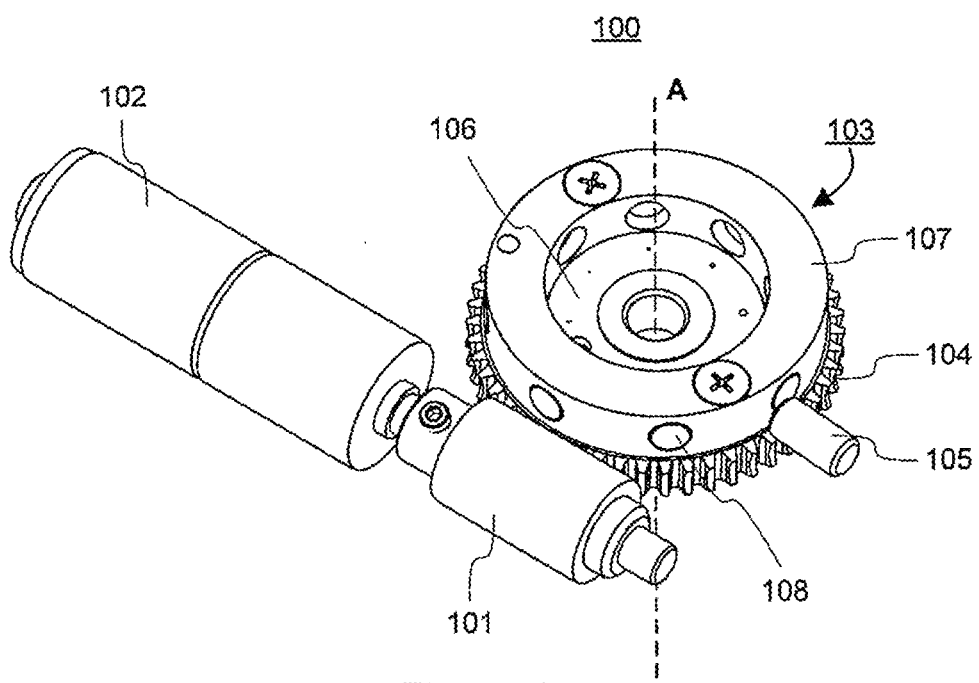
FIG. 2 schematically illustrates some aspects of a collimator assembly for an X-ray spectrometer device in accordance with an example.

FIG. 2 schematically illustrates some aspects of an exemplifying collimator assembly 100 for an X-ray spectrometer device. As described in the foregoing, energy dispersive X-ray spectrometry (EDX) serves as a non-limiting example of techniques that rely on X-ray spectrometry, and in the following, where applicable, EDX is predominantly employed as a non-limiting example in this regard.

Figure 1:
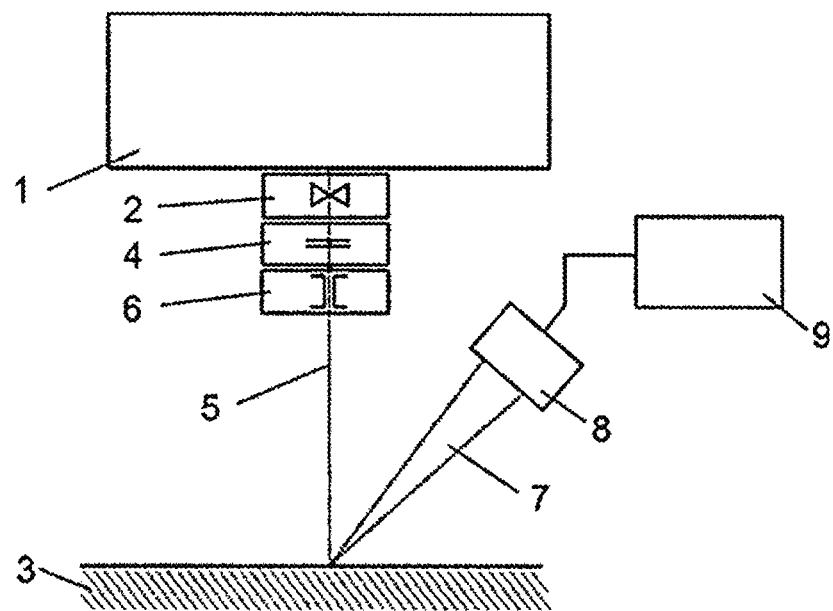
FIG. 1 schematically illustrates some components of a generic EDX device in accordance with an example.

The EDX device making use of the collimator assembly 100 may be operable, for example, along the outline described in the foregoing with references to FIG. 1, while the collimator assembly 100 may be used to serve as the collimator 6 described in context of FIG. 1. The collimator assembly 100 is provided as a worm drive where a worm 101 that is rotatable by an electric motor 102 is arranged to drive a (circular) worm gear assembly 103 having teeth 104 arranged on its outer perimeter. The electric motor 102 may be provided, for example, as a stepper motor. The worm 101 and the electric motor 102 may be jointly referred to as a driving assembly that serves to drive the worm gear assembly 103. FIG. 2 further shows a vertical line A that indicates the axis of rotation of the worm gear assembly 103 The worm 101 may be alternatively referred to as a worm screw 101, whereas the worm gear assembly 103 may be alternatively referred to as a worm wheel assembly 103.

The collimator assembly 100 further comprises a magnet 105 arranged in a fixed position with respect to the worm gear assembly 103. The magnet 105 is referred to in the following a stationary magnet 105 due to its fixed position with respect to the worm gear assembly 103. The worm gear assembly 103 further comprises a collimator plate 106 having a plurality of apertures arranged therein and a frame ring 107 arranged to hold a plurality of magnets 108 in respective fixed positions with respect to the collimator plate 106. The magnets 108 are referred to in the following as latch magnets 108 since they serve to facilitate keeping the worm gear assembly 103—and hence the apertures in the collimator plate 106—in a desired rotational position, as will be described in more detail in the following.

Figure 3:
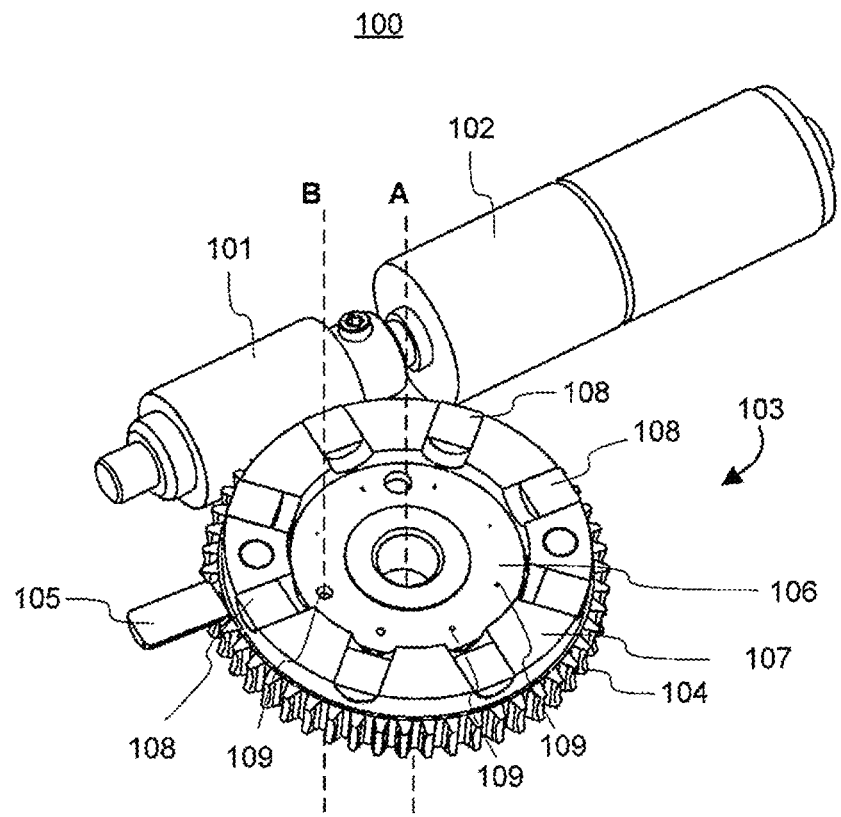
FIG. 3 schematically illustrates some aspects of a collimator assembly for an X-ray spectrometer device in accordance with an example.

FIG. 3 schematically illustrates the collimator assembly 100 from a different angle and, in particular, shows a partial cross-section of some elements thereof to facilitate more detailed description of its components and operation. FIG. 3 shows a vertical line B that indicates the axis along which a collimated X-ray beam is provided from the EDX device making use of the collimator assembly 100. In the following, the line B is also referred to as an axis B, as a reference axis or as a nominal axis. The collimator plate 106 has a plurality of apertures 109 arranged therein, each aperture 109 serving as a collimator when the worm gear assembly 103 is rotated into a position where the center of a respective aperture 109 spatially coincides with the primary X-ray beam at position of the axis B (i.e. the reference axis). Typically, the width (i.e. the radius or diameter) of the primary X-ray beam is substantially larger than that of the apertures 109, an aperture 109 thereby allowing a narrow sub-portion of the primary X-ray beam to pass the collimator plate 106 as the collimated primary X-ray beam towards a desired location in the sample surface. The apertures 109 are different in size and/or shape, thereby providing different collimation characteristics. Note that for graphical clarity only some of the apertures 109 are explicitly pointed out in the illustration of FIG. 3, while the example therein includes eight apertures 109 in total.

Each of the plurality of latch magnets 108 secured in its respective position by the frame ring 107 is arranged in a respective position with respect to a corresponding one of the apertures 109 in the collimator plate 106. Hence, the plurality of latch magnets 108 and the plurality of apertures 109 constitute a plurality of magnet-aperture pairs that serve to firmly hold a given one of the apertures 109 in a desired rotational position after having been brought therein by operation of the worm drive provided by the worm screw 101, the electric motor 102 and the worm gear assembly 103. In this regard, the desired rotational position is the one where the given one of the apertures 109 spatially coincides with the axis B as accurately as possible, as described in more detail in the following.

In practice, the worm drive typically involves some positional inaccuracy due to backlash caused by slightly loose mesh between the teeth 104 of the worm gear assembly 103 and those of the worm screw 101: once the worm gear assembly 103 has been driven by the worm drive to a desired rotational position, due to inevitable 'looseness' in the match between the teeth 104 of the worm gear assembly 103 and those of the worm screw 101 there is some 'wiggle room' for the rotational position of the worm gear assembly 103, which may allow a small further rotational movement of the gear assembly 103, which is commonly referred to as backlash. Even though the positional inaccuracy resulting from the backlash may be small in absolute value, in many scenarios it has a detrimental effect to the collimation characteristics of the system due to resulting uncontrolled mismatch between position of the center of the respective aperture 109 and the axis B. Hence, even though the given one of the apertures 109 may spatially coincide with the primary X-ray beam despite the positional mismatch, the resulting collimated X-ray beam may not meet the sample surface at or close enough to the desired location indicated by the axis B, which typically results in compromised analysis performance.

In theory, the positional accuracy could be improved by providing a tighter (or closer) mesh between the teeth 104 of the worm gear assembly 103 and those of the worm screw 101. However, this would necessarily only partially address the problem of positional inaccuracy since in any real-life arrangement there is inevitably at least some level of backlash involved, while on the other hand a tighter (or closer) mesh would result in increased friction between the worm gear assembly 103 and the worm screw 101, thereby preventing sufficiently smooth rotation of the worm gear assembly 103.

In the collimator assembly 100, the arrangement of the latch magnets 108 and the apertures 109 in the worm gear assembly 103 in combination with a suitable (fixed) position of the stationary magnet 105 with respect to the worm gear assembly 103 enables overcoming the positional inaccuracy resulting from the backlash in the worm drive system and, consequently, enables improved accuracy in positioning a selected one of the apertures 109 to spatially coincide with the axis B that indicates the desired axis of the collimated X-ray beam. Some aspects concerning an exemplifying arrangement of the latch magnets 108, the apertures 109 and the stationary magnet 105 are described in the following with references to FIG. 4A, which provides a schematic plan view to a partial cross-section of the worm gear assembly 103 together with the stationary magnet 105.

Figure 4A:
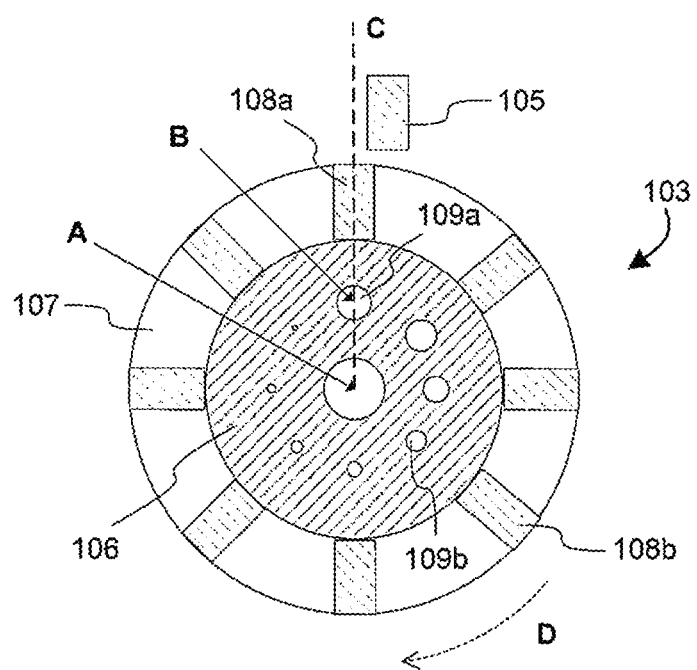
FIG. 4A schematically illustrates a gear assembly in accordance with an example.

In the example of FIG. 4A, the worm gear assembly 103 is shown with the collimator plate 106 having the plurality apertures 109 arranged therein. As described in the foregoing, the apertures 109 are different in size and/or shape, thereby providing different collimation characteristics. The collimator plate 106 is surrounded by the plurality of latch magnets 108 arranged to surround the collimator plate 106 in respective fixed positions with respect to the collimator plate 106 and the apertures 109 therein. The latch magnets 108 may be secured in the respective positions by using the frame ring 107 having the plurality of latch magnets 108 arranged therein or by using other suitable structure for fixing the magnets into the worm gear assembly 103. The stationary magnet 105 is positioned in the same or substantially the same plane with the worm gear assembly 103 outside the perimeter of the worm gear assembly 103. In the example of FIG. 4A the stationary magnet 105 and the latch magnets 108 are arranged with respect to each other such that a repelling magnetic force between the stationary magnet 105 and one of the latch magnets 108 brought into proximity of the stationary magnet 105 is created. Such an arrangement of the magnets 105, 108 may be provided e.g. by arranging them with respect to each other such that the same magnetic poles of the stationary magnet 105 and the latch magnet 108 that is brought into proximity thereof are facing each other. In the example of FIG. 4A this may be provided e.g. by arranging the stationary magnet 105 such that a predefined one of its magnetic poles (e.g. the north pole) is facing the worm gear assembly 103 and arranging each of the latch magnets 108 in the worm gear assembly 103 such that said predetermined one of the magnetic poles therein (e.g. the north pole) is facing the outer perimeter of the worm gear assembly 103. The stationary magnet 105 and the plurality of the latch magnets 108 may be jointly referred to as a magnet arrangement, whereas the stationary magnet 105 and the plurality of the latch magnets 108 may be referred to as components of the magnet arrangement.

For graphical clarity of the illustration, FIG. 4A explicitly indicates only two of the apertures 109a, 109b with dedicated reference designators, while the illustration shows eight apertures 109 in total. Similarly, only two of the latch magnets 108a, 108b are explicitly indicated using dedicated reference designators, while the illustration shows eight latch magnets 108 in total. In the example of FIG. 4A, the latch magnet 108a is aligned in a radial direction with the aperture 109a, the latch magnet 108a and the aperture 109a thereby forming a magnet-aperture pair in this example. Similarly, another magnet-aperture pair of this example is formed by the latch magnet 108b and the aperture 109b that are likewise aligned in a radial direction—and the same holds also for the remaining radially aligned pairs of a latch magnet 108 and the aperture 109.

The illustration in FIG. 4A further shows the position of the axis B that denotes the desired position of the axis of the collimated X-ray beam and the position of the axis A that denotes the axis of rotation, where both axes A and B are perpendicular or substantially perpendicular to the plane of the worm gear assembly 103 illustrated in FIG. 4A. Each of the plurality of latch magnets 108 is arranged at the same or substantially the same distance from the position of the axis A. Yet further, FIG. 4A also illustrates a line C that extends in a radial direction from the position of the axis A via the position of the axis B, while the stationary magnet 105 is offset from the (conceptual) line C in a first direction of rotation, which in the illustration of FIG. 4 is the clockwise direction, also indicated by a curved arrow D. It should be noted that the first direction of rotation that in the example of FIG. 4A (as well as in subsequent examples) is the clockwise direction is predominantly applied to assist discussion concerning positioning of the magnets. This is, however, a non-limiting choice made for clarity and brevity of description and hence in other examples the 'first direction of rotation' may be the counterclockwise direction.

The worm drive may be employed to rotate the worm gear assembly 103 to bring the desired one of the apertures 109 (in the example of FIG. 4A the aperture 109a) into a position where its center is spatially aligned with the axis B. The rotation may be in the first direction of rotation or opposite to the first direction of rotation. Without the arrangement of magnets 105 and 108a the backlash would allow a small further rotational movement of the worm gear assembly 103 (e.g. in the clockwise direction), which in turn would result in misalignment between the center of the aperture 109a and the axis B. However, in the example illustrated in FIG. 4A the repelling magnetic force between the stationary magnet 105 and the latch magnet 108a serves as a retraction force that pushes the worm gear assembly 103 into a predefined direction of rotation that in the example of FIG. 4A (as well as in the subsequent examples) is the direction the opposite of the first direction of rotation (e.g. the counter-clockwise direction). This retraction force ensures keeping a side of a tooth of the worm gear assembly 103 pressed against the tooth of the worm screw 101 to prevent the further rotational movement that would be otherwise allowed by the backlash, thereby keeping the center of the aperture 109a spatially aligned with the axis B.

Figure 4B:
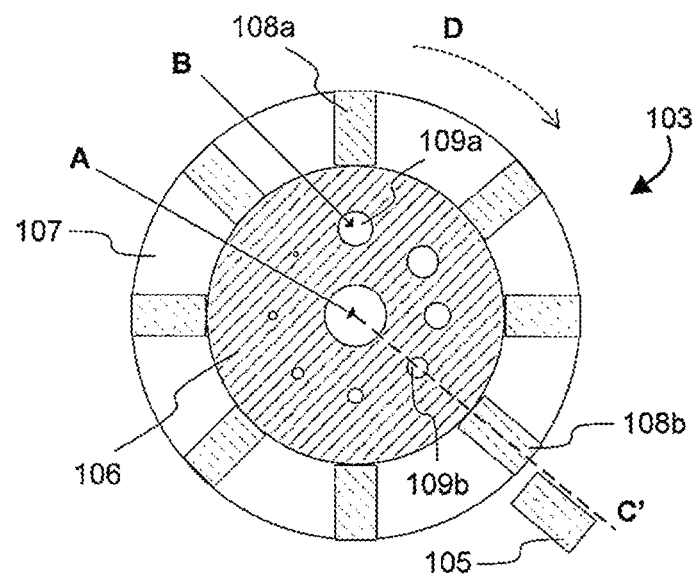
FIG. 4B schematically illustrates a gear assembly in accordance with another example.

The magnet arrangement illustrated in the example of FIG. 4A may be varied in a number of ways without departing from the same inventive idea. As an example, the magnet-aperture pair is not necessarily formed by the aperture 109 and the latch magnet 108 that are aligned in a radial direction with each other. As an example in this regard, FIG. 4B schematically illustrates another exemplifying magnet arrangement, where the stationary magnet 105 is positioned with respect to the axis B in manner different from that applied in the example of FIG. 4A: the stationary magnet 105 is offset from the (conceptual) line C' that extends in a radial direction from the position of the axis A via a position that is offset from the position of the axis B in the angular direction. Also in this example the offset of the stationary magnet 105 from the (conceptual) line C' is to the first direction of rotation (e.g. the clockwise direction as indicated by the curved arrow D). Hence, in the example of FIG. 4B the repelling magnetic force that serves as the retracting force that ensures keeping the correct spatial alignment between the aperture 109a and the axis B is created by the stationary magnet 105 and the latch magnet 108b, while in this scenario the latch magnet 108b and the aperture 109a form a magnet-aperture pair.

Figure 4C:
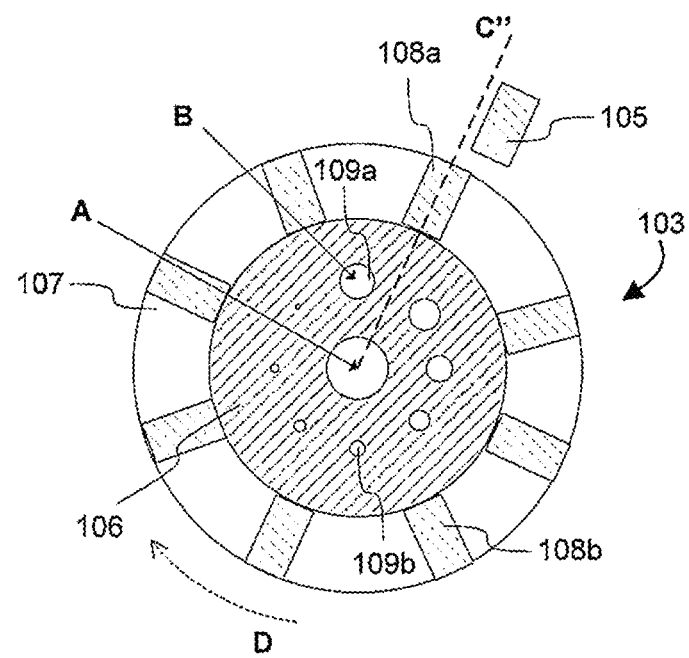
FIG. 4C schematically illustrates a gear assembly in accordance with a further example.

FIG. 4C schematically illustrates a further example of the magnet arrangement, where the plurality of latch magnets 108 and the plurality of apertures 109 are not aligned with each other in a radial direction. In the example of FIG. 4C, the stationary magnet 105 is offset from the (conceptual) line C" that extends in a radial direction from the position of the axis A via a position that is (angularly) offset from the position of the axis B. Also in this example the offset of the stationary magnet 105 from the (conceptual) line C" is to the first direction of rotation (e.g. the clockwise direction indicated by the curved arrow D). In the example of FIG. 4C, the repelling magnetic force that serves as the retracting force that ensures keeping correct spatial alignment between the aperture 109a and the axis B is created by the stationary magnet 105 and the latch magnet 108a, the latch magnet 108a and the aperture 109a thereby forming a magnet-aperture pair in this scenario.

In general, in a scenario exemplified via FIGS. 4A to 4C the repelling magnetic force, which serves to provide the retracting force for securing the worm gear assembly 103 into a desired rotational position is created by the stationary magnet 105 and the one of the latch magnets 108 that is closest to the stationary magnet 105 when the worm gear assembly 103 is brought into a rotational position where a selected one of the apertures 109 (e.g. the aperture 109a) is spatially aligned with the axis B. In a further exemplifying variation of the scenario depicted in FIGS. 4A to 4C, there may be a plurality of stationary magnets arranged in respective fixed positions with respect to the worm gear assembly 103 and/or the axis B. As an example in this regard, a first stationary magnet may be arranged in the position described in the example of FIG. 4A whereas a second stationary magnet may be arranged in the position described in the example of FIG. 4B. In general, there may be a respective stationary magnet arranged in a position having an above-described angular offset to a respective one of the latch magnets 108 for one or more of the latch magnets 108 when the worm gear assembly 103 is brought into a rotational position where a selected one of the apertures 109 (e.g. the aperture 109a) is spatially aligned with the axis B.

Figure 5:
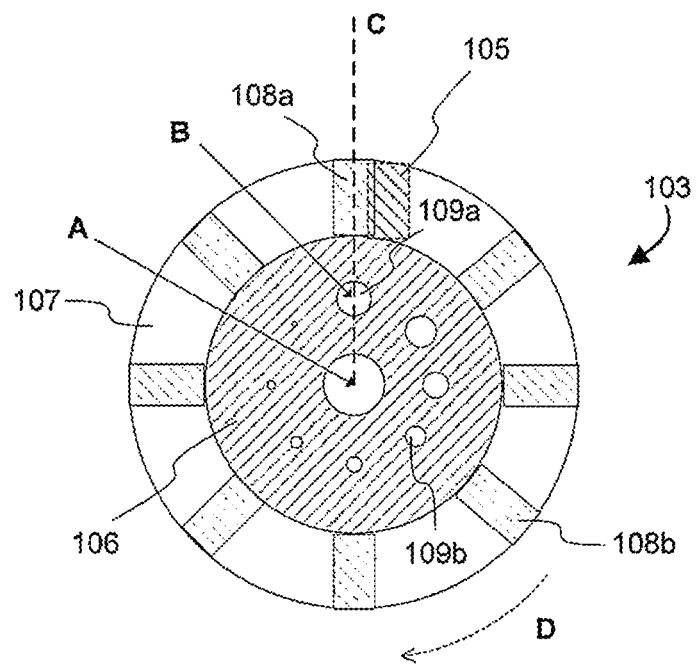
FIG. 5 schematically illustrates a gear assembly in accordance with a further example.

FIG. 5 schematically illustrates yet another variation of the magnet arrangement. In this example, the stationary magnet 105 is illustrated using a hatched outline to illustrate its position in a plane that is parallel with the plane of the worm gear assembly 103. In other words, in the example of FIG. 5 the stationary magnet 105 is positioned in a plane that is either 'below' or 'above' the worm gear assembly 103. Moreover, the stationary magnet 105 is arranged in its plane in a distance from the axis A that is the same or substantially the same as the distance of the latch magnets 108 from the axis A. Furthermore, in the example of FIG. 5 the stationary magnet 105 is offset in the first direction of rotation (e.g. the clockwise direction indicated by the curved arrow D) from the one of the latch magnets 108 that is closest to the stationary magnet 105 when the worm gear assembly 103 is brought into a rotational position where a selected one of the apertures 109 (e.g. the aperture 109a) is spatially aligned with the axis B. In the example of FIG. 5, this offset is similar to and shares the purpose with that described in the foregoing with references to the example of FIG. 4A. In the example of FIG. 5 the arrangement of the magnets 105, 108 with respect to position and/or orientation of their magnetic poles such that the desired repelling magnetic force is created may be provided e.g. by arranging them with respect to each other such that the same magnetic poles of the stationary magnet 105 and the latch magnet 108 that is brought into proximity thereof are facing each other. As an example, this may be provided, for example, by arranging the stationary magnet 105 such that a predefined one of its magnetic poles (e.g. the north pole) is facing the worm gear assembly 103 and arranging each of the latch magnets 108 such that said predetermined one of the magnetic poles therein (e.g. the north pole) is facing the stationary magnet 105.

Herein, the example of FIG. 5 is provided as a variation of the example of FIG. 4A. Similar modification with respect to the position of the stationary magnet 105 in relation to the latch magnets 108 is, however, equally applicable to the specific examples of FIGS. 4B and 4C and to the general approach for arranging the magnets 105, 108 with respected to each other illustrated via the examples of FIGS. 4A to 4C as well.

Throughout the examples of FIGS. 4A to 5, the collimator plate 106 as well as other parts of the worm gear assembly 103 apart from the latch magnets 108 are made of a suitable non-magnetic material, e.g. a non-magnetic metal or metal alloy. As non-limiting examples in this regard, the collimator plate 106 and/or other parts of the worm gear assembly 103 (apart from the latch magnets 109) may be made of brass or non-magnetic (e.g. austenitic) stainless steel.

Figure 6A:
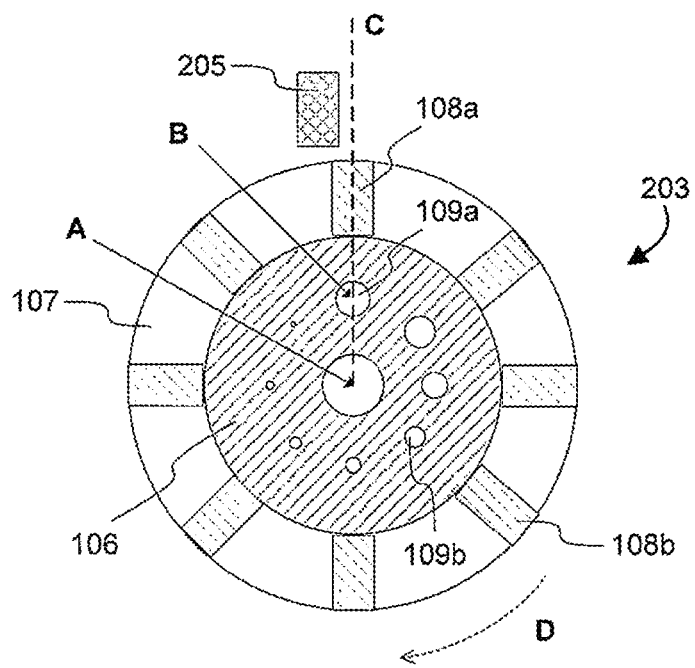
FIG. 6A schematically illustrates a gear assembly in accordance with a further example.

FIG. 6A schematically illustrates a further variation of the magnet arrangement, again using the specific example of FIG. 4A as a basis. FIG. 6A schematically illustrates a worm gear assembly 203 that is similar to the worm gear assembly 103 of FIG. 4A as part of a collimator assembly where the stationary magnet 105 has been replaced with a stationary magnetic element 205 that is arranged in a fixed position with respect to the worm gear assembly 203. Throughout this disclosure, the term "magnetic element" is employed to denote an element that is attracted by a magnet but that is not a magnet itself. In the example of FIG. 6A the exact position/orientation of the latch magnets 108 with respect to their magnetic poles does not play a significant role since they serve to attract the magnetic element 205 brought into proximity thereof regardless of the orientation of its magnetic poles with respect to the magnetic element 205. The magnetic element 205 and the plurality of the latch magnets 108 may be jointly referred to as a magnet arrangement, whereas the magnetic element 205 and the plurality of the latch magnets 108 may be referred to as components of the magnet arrangement.

In the example illustrated in FIG. 6A, the arrangement of the latch magnets 108 in the worm gear assembly 203 is the same described for their arrangement in the worm gear assembly 103 in the foregoing with references to the example illustrated in FIG. 4A. The magnetic element 205 is positioned in the same or substantially the same plane with the worm gear assembly 203 outside the perimeter of the worm gear assembly 203. The magnetic element 205 and the plurality of latch magnets 108 may be jointly referred to as a magnet arrangement.

FIG. 6A illustrates a curved arrow D that denotes the first direction of rotation, which also in this example is the clockwise direction. FIG. 6A further illustrates the line C that extends in a radial direction from the position of the axis A via the position of the axis B, while the magnetic element 205 is offset from the (conceptual) line C in a direction opposite to the first direction of rotation. Herein, the worm drive may be employed to rotate the worm gear assembly 203 to bring the desired one of the apertures 109 (in this example the aperture 109a) into a position where its center is spatially aligned with the axis B. The rotation may be in the first direction of rotation or opposite to the first direction of rotation. Without the arrangement of the magnetic element 205 and the latch magnets 108a the backlash would allow a small further rotational movement of the worm gear assembly 203 (e.g. in the clockwise direction), which in turn would result in misalignment between the aperture 109a and the axis B. However, in the example illustrated in FIG. 6A the attracting magnetic force between the magnetic element 205 and the latch magnet 108a pulls the worm gear assembly 203 opposite to the first direction of rotation (e.g. in the counter-clockwise direction) to prevent the further rotational movement that would be otherwise allowed by the backlash, thereby keeping the aperture 109a spatially aligned with the axis B.

In an exemplifying variation of the arrangement of FIG. 6A, the magnet arrangement may be modified such that the magnetic element 205 is replaced with the stationary magnet 105 and arranging the stationary magnet and the latch magnets 108 with respect to each other such that they provide an attracting magnetic force between the stationary magnet 105 and one of the latch magnets 108 brought into proximity thereof, which magnetic force serves to push the worm gear assembly 203 opposite to the first direction of rotation (e.g. in the counterclockwise direction) to prevent the further rotational movement that would be otherwise allowed by the backlash. In this variation of the example of FIG. 6A such an arrangement of the magnets 105, 108 with respect to position and/or orientation of their magnetic poles may be provided e.g. by arranging the magnets 105, 108 with respect to each other such that the opposite magnetic poles of the stationary magnet 105 and the latch magnet 108 that is brought into proximity thereof are facing each other. As an example, this may be provided, for example, by arranging the stationary magnet 105 such that a predefined one of its magnetic poles (e.g. the north pole) is facing the worm gear assembly 103 and arranging each of the latch magnets 108 such that the opposite one of its poles (e.g. the south pole) is facing the stationary magnet 105 when brought into proximity of the stationary magnet 105. As an example, this may be provided e.g. by arranging the stationary magnet 105 such that a predefined one of its poles (e.g. the north pole) is facing the worm gear assembly 103 and arranging the latch magnets 108 such that the opposite one of its poles (e.g. the south pole) is facing the outer perimeter of the worm gear assembly 103

Figure 6B:
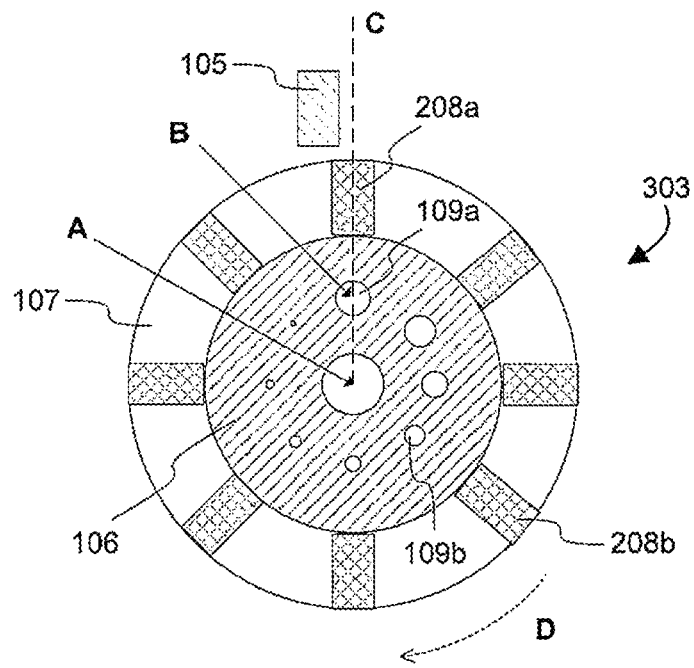
FIG. 6B schematically illustrates a gear assembly in accordance with a further example.

FIG. 6B schematically illustrates a further variation of the magnet arrangement, again using the specific example of FIG. 4A as a basis. FIG. 6B schematically illustrates a worm gear assembly 303 that is similar to the worm gear assembly 103 of FIG. 4A in an arrangement where the plurality of latch magnets 108 is replaced with the corresponding plurality of magnetic elements 208 that are arranged to surround the collimator plate 106 in respective fixed positions with respect to the collimator plate 106 and the apertures 109 therein. The stationary magnet 105 and the plurality of the magnetic elements 208 may be jointly referred to as a magnet arrangement, whereas the stationary magnet 105 and the plurality of the magnet elements 208 may be referred to as components of the magnet arrangement.

In the example illustrated in FIG. 6B, the arrangement of the magnetic elements 208 in the worm gear assembly 303 is the same as the arrangement of latch magnets 108 described in the foregoing for the worm gear assembly 103, whereas the stationary magnet 105 is positioned in the same manner as described in the foregoing for the magnetic element 205. In this example, the exact position/orientation of the stationary magnet 105 with respect to its magnetic poles does not play a significant role since it serves to attract the magnetic element 208 brought into proximity thereof regardless of the orientation of its magnetic poles with respect to said magnetic element 208

Hence, the worm drive may be employed to rotate the worm gear assembly 303 to bring the desired one of the apertures 109 (in this example the aperture 109a) into a position where it is spatially aligned with the axis B. Without the arrangement of the stationary magnet 105 and the magnetic element 208a the backlash would allow a small further rotational movement of the worm gear assembly 303 (e.g. in the clockwise direction), which in turn would result in misalignment between the aperture 109a and the axis B. However, the attracting magnetic force between the stationary magnet 105 and the magnetic element 208a pulls the worm gear assembly 303 opposite to the first direction of rotation (e.g. in the counter-clockwise direction) to prevent the further rotational movement that would be otherwise allowed by the backlash, thereby keeping the center of the aperture 109a spatially aligned with the axis B.

The examples of FIGS. 6A and 6B are provided as respective variations of the example of FIG. 4A. Similar modifications with respect to the components of the magnet arrangement are, however, equally applicable to the specific examples of FIGS. 4B and 4C and to the general approach for providing the magnet arrangement illustrated via the examples of FIGS. 4A to 4C as well. Moreover, the position of the magnetic element 205 in relation to the latch magnets 108 or the position of the stationary magnet 105 in relation to the plurality of magnetic elements 208 may be varied as described in the foregoing with references to the example illustrated in FIG. 5 for the arrangement of the stationary magnet 105 and the latch magnets 108.

In the foregoing, a plurality of magnet arrangements where a plurality of magnet arrangement components is arranged in the worm gear assembly 103, 203, 303 and where a single stationary component of the magnet arrangement is provided outside the worm gear assembly 103, 203, 303 in a fixed position with respect thereto are described via a number of examples. In further examples the distribution of the magnet arrangement components may be varied in such a manner that the worm gear assembly 103, 203, 303 is provided with a single magnet arrangement component (e.g. a magnet) while the plurality of magnet arrangement components (e.g. a plurality of latch magnets) are provided outside the worm gear assembly 103, 203, 303 in respective fixed position with respect thereto.

Figure 7:
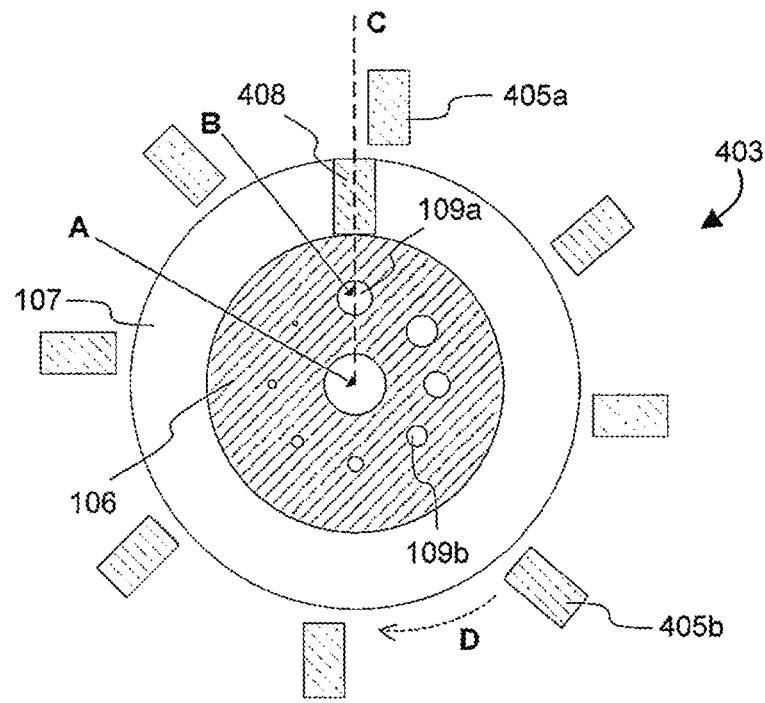
FIG. 7 schematically illustrates a gear assembly in accordance with a further example.

As an example in this regard, FIG. 7 schematically illustrates such variation basing on the example of FIG. 4A, wherein the collimator plate 106 having the plurality of apertures 109 that are different in size and/or shape arranged therein is provided with a single magnet 408 arranged at or close to the perimeter of the worm gear assembly 403 in a fixed position with respect to the collimator plate 106 and the apertures 109 therein. The magnet 408 may be secured in its position by using the frame ring 107 having the magnet 408 arranged therein or by using other suitable structure for fixing the magnet 408 into the worm gear assembly 403. A plurality of stationary latch magnets 405 are positioned in respective fixed positions with respect to the worm gear assembly 403 in the same or substantially the same plane with the worm gear assembly 403 outside the perimeter of the worm gear assembly 103. In the example of FIG. 7 the magnet 408 and the stationary latch magnets 405 are arranged with respect to each other such that a repelling magnetic force between the magnet 408 and one of the latch magnets 405 when the magnet 408 is brought into proximity thereof is created. Such an arrangement of the magnets 405, 408 may be provided e.g. by arranging them with respect to each other such that the same magnetic poles of the latch magnet 405 and the magnet 408 brought into proximity thereof are facing each other. In the example of FIG. 7 this may be provided e.g. by arranging the stationary latch magnets 405 such that a predefined one of their poles (e.g. the north pole) is facing the worm gear assembly 403 and arranging the magnet 408 in the worm gear assembly 403 such that the predetermined one of its poles (e.g. the north pole) is facing the outer perimeter of the worm gear assembly 403 The magnet 408 and the plurality of stationary latch magnets 405 may be jointly referred to as a magnet arrangement, whereas the magnet 408 and the plurality of latch magnets 405 may be referred to as components of the magnet arrangement.

For graphical clarity of the illustration, FIG. 7 explicitly indicates only two of the apertures 109a, 109b with dedicated reference designators, while the illustration shows eight apertures 109 in total. Similarly, only two of the stationary latch magnets 405a, 405b are explicitly indicated using dedicated reference designators, while the illustration shows eight stationary latch magnets 405 in total. FIG. 7 also illustrates the line C that extends in a radial direction from the position of the axis A via the position of the axis B. In the example of FIG. 7, the magnet 408 is aligned in a radial direction with the aperture 109a (i.e. positioned along the line C at or close to the outer perimeter of the worm gear assembly 403), whereas the stationary latch magnet 405a is offset from the (conceptual) line C in the first direction of rotation, which in the illustration of FIG. 7 is the clockwise direction, also indicated by the curved arrow D, the stationary latch magnet 405a and the aperture 109a hence forming a magnet-aperture pair in this example. Similarly, another magnet-aperture pair of this example is formed by the stationary latch magnet 405b and the aperture 109b, while similar pairing is found also for the remaining pairs of a stationary latch magnet 405 and the aperture 109.

The worm drive may be employed to rotate the worm gear assembly 403 to bring the desired one of the apertures 109 (in the example of FIG. 7 the aperture 109a) into a position where it is spatially aligned with the axis B. Without the arrangement of magnets 408 and 405a the backlash would allow a small further rotational movement of the worm gear assembly 403 (e.g. in the clockwise direction), which in turn would result in misalignment between the aperture 109a and the axis B. However, in the example illustrated in FIG. 7 the repelling magnetic force between the magnet 408 and the stationary latch magnet 405a that have the same magnetic polarity serve to provide a retraction force that pushes the worm gear assembly 403 into a second direction of rotation that is the opposite of the first direction of rotation (e.g. in the counter-clockwise direction) to prevent the further rotational movement that would be otherwise allowed by the backlash, thereby keeping the aperture 109a spatially aligned with the axis B.

While the example of FIG. 7 is provided as a modification of the magnet arrangement of the example of FIG. 4A, a corresponding modification is readily applicable to any of the other examples described in the foregoing, e.g. those illustrated in FIGS. 4B to 6B.

Throughout the examples described in the foregoing, the characteristics of the magnets 105, 108, 405, 408 and/or the magnetic elements 205, 208 are chosen such that the repelling or attracting magnetic force arising from the magnet arrangement that serves to push or pull the worm gear assembly 103, 203, 303, 403 against the first direction of rotation is sufficient to prevent free rotational movement of the worm gear assembly 103, 203, 303. 403 from occurring while it is not strong enough to cause the worm gear assembly 103, 203, 303, 403 rotating the worm screw 101. Each of the magnets 105, 108, 405, 408 may be provided as a respective permanent magnet, such as a neodymium magnet. Alternatively, at least some of the magnets 105, 108, 405, 408 may be provided as respective electromagnets. Each of the magnetic elements 205, 208 may be provided as a respective suitable piece of ferromagnetic or ferrimagnetic material, such as iron, cobalt, nickel or an alloy including iron, cobalt or nickel. Throughout the examples depicted in FIGS. 4A to 7 the magnets 105, 108, 405, 408 and/or the magnetic elements 205, 208 are schematically illustrated in order to provide non-limiting examples of relative positions of the magnets 105, 108, 405, 408 and/or the magnetic elements 205, 208 with respect to each other and/or to the apertures 109 of the collimator plate 106. Hence, the illustrations of FIGS. 4A to 7 in this regard do not suggest any specific shape of the magnets 105, 108, 405, 408 and/or the magnetic elements 205, 208.

In the foregoing, the examples throughout FIGS. 2 to 7 make use of the collimator plate 106 having eight apertures 109 with evenly distributed angular spacing. This, however, is a non-limiting example and different number and/or arrangement of apertures may be employed instead. For example, the collimator plate 106 may include less than eight apertures 109 (any number in the range from two to seven, e.g. four or six) or the collimator plate 106 may include more than eight apertures 109 (e.g. ten, twelve or sixteen). Additionally or alternatively, the apertures 109 may disturbed in the angular direction in a non-uniform manner with the latch magnets 108 (or the magnetic elements 208) arranged to surround the collimator plate 106 positioned accordingly to ensure appropriate magnetic push or pull when the center of the desired one of the apertures 109 is brought to a rotational position where it is spatially aligned with the axis B.

The size of the collimator plate 106 and the worm gear assembly 103, 203, 303, 403 as well as the number of apertures 109 arranged in the collimator plate 106 may be selected in accordance with characteristics and/or requirements of the X-ray spectrometer device making use of the collimator assembly 100. As a non-limiting example, the apertures 109 may be provided as circular or rectangular apertures that have a diameter or a diagonal, respectively, in a range from a few ten micrometers to a few hundred micrometers. As a non-limiting example concerning the size of the worm gear assembly 103, 203, 303, 403, it may have a diameter in a range from a few centimeters to approximately 20 centimeters.

In the foregoing, various examples are provided with references to usage of the worm drive to rotate the worm gear assembly 103, 203, 303, 403. However, the worm drive is a non-limiting example in this regard and e.g. a suitable arrangement of spur gears or helical gears may be employed instead. Moreover, in the foregoing various examples are provided with references to usage of the worm gear assembly 103, 203, 303, 403 in context of an X-ray spectrometer device such as a EDX device, the disclosed principle of creating the repelling or attracting magnetic force to prevent rotational movement allowed by the backlash between the worm gear and the worm screw may be allowed in a different framework and/or arranged to prevent backlash for a worm gear that has a size that has a size significantly larger or significantly smaller than that envisaged in the foregoing.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A collimator assembly for an X-ray spectrometer device, the collimator assembly comprising
   a rotatable gear assembly including a collimator plate having a plurality of apertures of different size and/or shape arranged therein;
   a driving assembly for rotating the gear assembly to bring the gear assembly into a rotational position where a selected one of the plurality of apertures is spatially aligned with a predefined axis (B) along which a collimated X-ray beam is to be provided from the X-ray spectrometer device; and
   a magnet arrangement for generating a magnetic force that is arranged to push or pull the gear assembly into a predefined direction of rotation to keep the selected one of the plurality of apertures spatially aligned with said predefined axis (B).

2. A collimator assembly according to claim 1, wherein said gear assembly includes a worm gear assembly and wherein the driving assembly comprises a worm screw and an electric motor for rotating the worm screw.

3. A collimator assembly according to claim 1, wherein said magnet arrangement comprises
   a stationary magnet arranged in a fixed position with respect to the gear assembly, and
   a plurality of latch magnets arranged in the gear assembly such that the stationary magnet and a latch magnet brought into proximity thereof serve to provide a repelling magnetic force that pushes the gear assembly into said predefined direction of rotation.

4. A collimator assembly according to claim 3, wherein said stationary magnet is arranged in a fixed position with respect to the gear assembly with a predefined one of its magnetic poles facing the gear assembly;
   said plurality of latch magnets are each arranged in the gear assembly at the same or substantially same distance from an axis of rotation of the gear assembly in a respective fixed position with respect to a respective one of the plurality of apertures such that the predefined magnetic pole of the latch magnet is facing outwards from the gear assembly,
   wherein the stationary magnet is offset against said predefined direction of rotation from a latch magnet that is closest thereto when the gear assembly is brought into a rotational position where the selected one of the plurality of apertures is spatially aligned with said predefined axis (B), the magnet arrangement thereby generating the repelling magnetic force for pushing the gear assembly into said pre-defined direction of rotation.

5. A collimator assembly according to claim 4, wherein the stationary magnet and the latch magnets are arranged with respect to the gear assembly in one of the following ways:
   the stationary magnet is arranged in substantially the same plane with the gear assembly outside the perimeter of the gear assembly in a position that is offset, against said predefined direction of rotation, from a conceptual radial line from the axis of rotation to the latch magnet that is closest thereto when the gear assembly is brought into said rotational position where the selected one of the plurality of apertures is spatially aligned with said predefined axis (B) and each of the latch magnets is arranged such that said predefined magnetic pole of the latch magnet is facing the outer perimeter of the gear assembly; or
   the stationary magnet is arranged in a plane that is parallel to the gear assembly in a position that is substantially at the same distance from the axis of rotation of the gear assembly as the plurality of latch magnets and that is offset, against said predefined direction of rotation, from a conceptual radial line from the axis of rotation to the latch magnet that is closest thereto when the gear assembly is brought into said rotational position where the selected one of the plurality of apertures is spatially aligned with said predefined axis (B) and the each of the latch magnets is arranged such that said predefined magnetic pole of the latch magnet is facing said plane that is parallel to the gear assembly.

6. A collimator assembly according to claim 1 wherein, said magnet arrangement comprises
   a first magnet arrangement component arranged in a fixed position with respect to the gear assembly and
   a plurality of second magnet arrangement components arranged in the gear assembly such that the first magnet arrangement component and a second magnet arrangement component brought into proximity thereof serve to provide an attracting magnetic force that pulls the gear assembly into said predefined direction of rotation.

7. A collimator assembly according to claim 6, wherein said first magnet arrangement component is arranged in a fixed position with respect to the gear assembly;
   said plurality of second magnet arrangement components are each arranged in the gear assembly at the same or substantially same distance from an axis of rotation of the gear assembly in a respective fixed position with respect to a respective one of the plurality of apertures,
   wherein the first magnet arrangement component is offset in said predefined direction of rotation from a latch magnet that is closest thereto when the gear assembly is brought into a rotational position where the selected one of the plurality of apertures is spatially aligned with said predefined axis (B), the magnet arrangement thereby generating the attracting magnetic force for pulling the gear assembly into said predefined direction of rotation.

8. A collimator assembly according to claim 6, wherein the first magnet arrangement component is arranged with respect to the gear assembly in one of the following ways:
   the first magnet arrangement component is arranged in substantially the same plane with the gear assembly outside the perimeter of the gear assembly in a position that is offset, in said predefined direction of rotation, from a conceptual radial line from the axis of rotation to the second magnet arrangement component that is closest thereto when the gear assembly is brought into said rotational position where the selected one of the plurality of apertures is spatially aligned with said predefined axis (B); or the first magnet arrangement component is arranged in a plane that is parallel to the gear assembly in a position that is substantially at the same distance from the axis of rotation of the gear assembly as the plurality of second magnet arrangement components and that is offset, in said predefined direction of rotation, from a conceptual radial line from the axis of rotation to the second magnet arrangement component that is closest thereto when the gear assembly is brought into said rotational position where the selected one of the plurality of apertures is spatially aligned with said predefined axis (B).

9. A collimator assembly according to claim 6, wherein the first magnet arrangement component comprises a magnetic element that is attracted by a magnet, and the plurality of second magnet arrangement components comprises a respective plurality of latch magnets.

10. A collimator assembly according to claim 6, wherein the first magnet arrangement component comprises a stationary magnet, and the plurality of second magnet arrangement components comprises a respective plurality of magnetic elements that are attracted by a magnet.

11. A collimator assembly according to claim 6, wherein the first magnet arrangement component comprises a stationary magnet having a predefined one of its magnetic poles facing the gear assembly, and the plurality of second magnet arrangement components comprises a respective plurality of latch magnets, each arranged in the gear assembly such that its magnetic pole opposite to said predefined one is facing outwards from the gear assembly.

12. A collimator assembly according to claim 1, wherein said magnet arrangement comprises a plurality of stationary latch magnets arranged in respective fixed position with respect to the gear assembly, and a magnet arranged in the gear assembly such that a stationary latch magnet and the magnet brought into proximity thereof serve to provide a repelling magnetic force that pushes the gear assembly into said predefined direction of rotation.

13. A collimator assembly according to claim 1, wherein said magnet arrangement comprises a plurality of first magnet arrangement components arranged in respective fixed positions with respect to the gear assembly and a second magnet arrangement component arranged in the gear assembly such that a first magnet arrangement component and the second magnet arrangement component brought into proximity thereof serve to pro-vide an attracting magnetic force that pulls the gear assembly into said predefined direction of rotation.

14. A collimator assembly according to claim 13, wherein said magnet arrangement comprises one of the following:

said plurality of first magnet arrangement components provided as respective magnetic elements that are attracted by a magnet and said second magnet arrangement component provided as a magnet;

said plurality of first magnet arrangement components provided as respective magnets and said second magnet arrangement component provided as a magnetic element that is attracted by a magnet;

said plurality of first magnet arrangement components provided as respective magnets that each have a predefined one of its magnetic poles facing the gear assembly and said second magnet arrangement component provided as a magnet that has its magnetic pole opposite to said predefined one facing outwards from the gear assembly.

15. An energy dispersive X-ray spectrometer device comprising a collimator assembly according to claim 1.

* * * * *